United States Patent
Nicholas et al.

(10) Patent No.: US 10,600,027 B2
(45) Date of Patent: Mar. 24, 2020

(54) METHOD TO ASSESS AND ENHANCE VALUE CHARACTERISTICS OF PUBLISHED EMPIRICAL LITERATURE

(71) Applicant: OJER, LLC, Needham, MA (US)

(72) Inventors: Nolan Nicholas, Milford, MA (US);
David Carnahan, Needham, MA (US);
Thomas T. Morgan, Stow, MA (US);
Daniel Esposito, Milford, NH (US)

(73) Assignee: OJER, LLC, Needham, MA (US)

( * ) Notice: Subject to any disclaimer, the term of this patent is extended or adjusted under 35 U.S.C. 154(b) by 683 days.

(21) Appl. No.: 14/969,699

(22) Filed: Dec. 15, 2015

(65) Prior Publication Data

US 2016/0171097 A1    Jun. 16, 2016

Related U.S. Application Data

(60) Provisional application No. 62/091,845, filed on Dec. 15, 2014.

(51) Int. Cl.
*G06F 7/00*   (2006.01)
*G06Q 10/10*  (2012.01)
*G06F 16/25*  (2019.01)

(52) U.S. Cl.
CPC .......... *G06Q 10/10* (2013.01); *G06F 16/254* (2019.01)

(58) Field of Classification Search
CPC ......... G06F 17/30598; G06F 17/30705; G06F 17/30722
USPC ........................................ 707/740, 602, 756
See application file for complete search history.

(56) References Cited

U.S. PATENT DOCUMENTS

| | | | | |
|---|---|---|---|---|
| 2010/0131432 A1* | 5/2010 | Kennedy | ............... | G16B 25/00 705/500 |
| 2014/0019209 A1* | 1/2014 | Cole | ............... | G06Q 30/02 705/7.32 |
| 2014/0310062 A1* | 10/2014 | Klein | ............... | G06O 30/0203 705/7.32 |
| 2015/0264093 A1* | 9/2015 | Madisch | ............... | H04L 65/403 715/753 |
| 2015/0324445 A1* | 11/2015 | Tseng | ............... | G06Q 30/0203 726/28 |

* cited by examiner

*Primary Examiner* — Alexandria Y Bromell
(74) *Attorney, Agent, or Firm* — Pandiscio & Pandiscio, P.C.

(57) ABSTRACT

A method for performing a calculation operation to grade and catalog the repeatability of an author's technical or instructional publication or some sub-portion thereof, comprising: a first step of collecting data from a user or users with experience in said publication's replication; a second step of converting the elements of the data to numerical quantities; a third step of calculating a weighting function for that user or users and a weighting function for the author; a fourth step of multiplying elements or subsets of the data by a weighting function that may amplify or diminish the value of the data; a fifth step of aggregating the weighted subsets of data into one or more values; and a sixth step of weighting and averaging the data with historical data, if any.

21 Claims, 10 Drawing Sheets use of an * denotes an optional step use of an * denotes an optional step use of an * denotes an optional step use of an * denotes an optional step

FIG. 6

Detailed views of GUI and text

FIG. 6 (Continued)

Detailed views of GUI and text

METHOD TO ASSESS AND ENHANCE VALUE CHARACTERISTICS OF PUBLISHED EMPIRICAL LITERATURE

REFERENCE TO PENDING PRIOR PATENT APPLICATION

This patent application claims benefit of prior U.S. Provisional Patent Application Ser. No. 62/091,845, filed Dec. 15, 2014 by NanoLab, Inc. and Nolan Nicholas et al. for METHOD TO ASSESS AND ENHANCE VALUE CHARACTERISTICS OF PUBLISHED EMPIRICAL LITERATURE, which patent application is hereby incorporated herein by reference.

FIELD OF THE INVENTION

The present invention relates to a system and method of review for empirical literature.

BACKGROUND OF THE INVENTION

The present invention relates to a system and method of review for empirical literature.

Subsequent discussion of the empirical literature and this invention will be primarily described in the context of scientific research and development, including its literature and community. However, it will be recognized by those skilled in the art that this invention may be implemented in various other types of empirical literature and the associated communities, including but not limited to, medical research & clinical practice literature, project and "do it yourself" instructionals (such as Pinterest projects, instructional videos, instructional audio, seminars et cetera), school lesson planning, et cetera. Moreover, herein "article" can be used to refer not only to scientific publications but also refers to any such publically available instructional, including, but not limited to, text, video, seminars, or audio as appropriate to the particular circumstance.

One of the most substantial products created by scientific research & development is the publication of findings in the associated literature including both scientific publications, and patent literature. However, when an item of work is published in the empirical literature there remains a degree of uncertainty as to the accuracy of the findings reported. By some estimates, over half the findings reported in the scientific literature have significant inaccuracies. The significant probability that the information reported in any given publication is inaccurate creates a degree of uncertainty associated with the accuracy of any given report—that is, the probability of inaccuracy inherently reduces the rational expectation of accuracy. This uncertainty of probable accuracy will herein be referred to as 'unreliability'. (It is noteworthy that the reliability of a particular article may be increased by any information that clarifies the probable accuracy of the article e.g. information confirming the accuracy of the article OR information providing evidence of the inaccuracy of the article.) This unreliability significantly decreases the effective useful value of the empirical literature—both individually, and as a whole. Consequently, since new research is largely based on previous published findings, inaccuracies therein can lead to labor and economic inefficiencies in performing new research.

In the prior art, two primary methods have existed for reducing the unreliability of the empirical literature: 1) expert commentary peer review and 2) published replication trials.

1. Peer review takes several forms for the empirical literature with pre-publication peer review being the most commonly used. Peer review has long served as a publication filter for keeping "unmeritorious" and/or "obviously unreliable" reports from being published in the respected empirical literature, or to point out flaws in them after publication (e.g. in the form of letters to the editor, etc.). However, expert commentary peer review serves primarily to protect the plausibility of the empirical literature. Peer-reviewers are generally not required to attempt replication of the results themselves. Therefore, expert peer-review allows a substantial amount of "plausible" but ultimately inaccurate reportings to be published in the empirical literature which creates associated statistical unreliability. Nor is this key difficulty adequately resolved by more recent trials of "post-publication peer review", wherein commentary is invited after the article has been released for general reading and review.

2. The primary method for reducing the unreliability associated with reported literature which has been published (often after passing through peer-review) has been through replication trials wherein independent groups attempt replication of findings reported in the empirical literature and then themselves report the findings of these replication trials (either positive or negative) within the empirical literature. However, this method possesses certain intrinsic inefficiencies, is relatively slow, and in recent times has been utilized less and less with more groups and publications shifting to focus on publication of original work. Furthermore, corrections, errata, and technical rebuttals are often poorly associated with the original work, and are easily missed during routine literature searches. Other methods have also been proposed and/or developed for improving reliability of the scientific literature, such as paying for findings verification by independent laboratories (which incurs additional costs in time and monetary resources). In other avenues, people have reported on the reliability accuracy of the reports in the experimental literature through media such as personal internet platforms (e.g. blogs, twitter, etc.), informal "word of mouth" conversations, or (unquantified) forums such as ResearchGate.com and PhysicsForums.com, which lack a focus on reproducibility. In addition to other limitations, one of the key failures of these methods is the haphazard reportage and associated pitfalls.

SUMMARY OF THE INVENTION

The invention herein provides an apparatus for implementing a program for ranking and improving the experimental and/or methodological reliability of the empirical literature by which users can contribute quantified ranking data and ancillary details which are pertinent to understanding and improving the experimental and methodological reliability of articles in the published literature, and whereby these contributions are automatically aggregated, statistically processed, and reported. The apparatus includes a processor system for processing data, a database system for storing data relating to article reviews and user information, and a mechanism for connection to the internet, a private intranet, or other suitable communication network through which users can access this system. The processor operates to automatically update and re-calculate associated ranking data whenever information is added to the system causing an update to the information associated with an article and/or a user.

The invention herein provides a method for assessing and enhancing the reliability characteristics of articles published in the empirical literature by collecting article review information from users and statistically aggregating said data and reporting said review information in both individual and statistically aggregated forms.

The system and method of the invention herein enables an improvement to the reliability of the empirical literature and offers a number of advantages over previous systems through the incorporation of four central, interconnected elements.

(1) User rating system for alignment of interests and incentivization of contribution: The implementation of a user/author rating system that professionally and/or socially incentivizes participation in the improvement of the reliability of the empirical literature. This enables the interests of individual users and the associated community to be aligned in a way that enables the simultaneous increase in empirical literature reliability with minimized input of additional resources.

(2) System and method for quantification for assignment of article rankings: The implementation of a method wherein User-provided rankings are quantified in a manner that allows meaningful statistical aggregation.

(3) Automated repository focused on experimental reliability: The economic efficiency, speed, and repository effectiveness are maximized by the use of an automated 'online' repository which is focused on methodological and/or experimental reproducibility and results. This includes efficient 'publication' of both quantified rankings and non-quantified general discussion of the experimental reliability an article and rating of said discussions by the user community.

(4) System and method for sub-article partitioning of reviews and content: Reliability information is gathered from users and more efficiently provided to users with greater breadth and improved precision of specification through the utilization of partitioned reviews which may cover user specified portions of the methodology and experimental findings of an article or may include the entirety of an article.

Various embodiments of this invention may be implemented by utilization of two or more of these elements in combination. In a preferred embodiment, all of these elements will be implemented to maximize the effectiveness of this invention.

Hereinafter, the method taught herein for ranking and enhancing the experimental and/or methodological reliability of the empirical literature will be termed the "Peer-to-Peer Reliability Improvement Method" and referred to by the resulting acronym "PPRIM".

In one preferred form of the present invention, there is provided a method for performing a calculation operation to grade and catalog the repeatability of an author's technical or instructional publication or some sub-portion thereof, comprising:

a first step of collecting data from a user or users with experience in said publication's replication;

a second step of converting the elements of the data to numerical quantities;

a third step of calculating a weighting function for that user or users and a weighting function for the author;

a fourth step of multiplying elements or subsets of the data by a weighting function that may amplify or diminish the value of the data;

a fifth step of aggregating the weighted subsets of data into one or more values; and a sixth step of weighting and averaging the data with historical data, if any.

In another preferred form of the present invention, there is provided a computer programmed to perform the following steps, comprising:

a first step of accepting a user's inputs, such as from a survey, about repeatability of a technical publication;

a second step of converting the answers to numerical forms;

a third step of calculating weighting factors based on factors related to the user and to the publication author;

a fourth step of multiplying the numerical forms by the calculated weighting factors;

a fifth step of calculating a single repeatability index from the data; and a sixth step of adjusting the repeatability index over time to reflect additional data.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts, and further wherein:

FIG. 6 is a graphical user interface ("GUI") displaying a form whereby a user can post a review of an article in the empirical literature;

FIG. 7 is a GUI displaying a reviewed article according to an embodiment of the present invention.

DETAILED DESCRIPTION OF THE PREFERRED EMBODIMENTS

Figure 1:
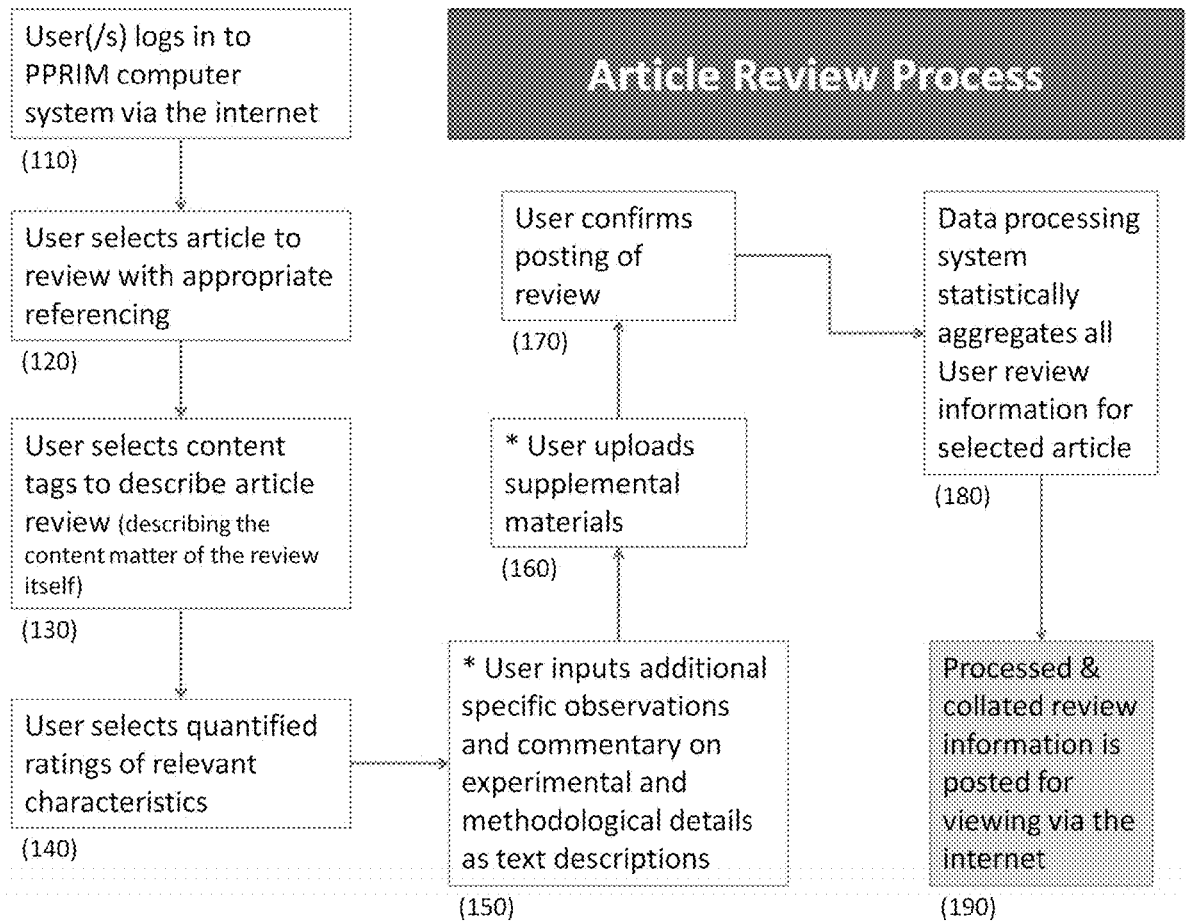
FIG. 1 is a flowchart illustrating a method of the present invention for reviewing an article of the empirical literature.

As discussed above, much of the empirical literature has suffered from unreliability which has not been sufficiently resolved by methods implemented in the prior art. The invention herein comprises an essentially automated repository database focused on experimental reliability where users who have attempted experimental replication may post textual and/or numerical reviews of experimental methodology and outcomes reported in empirical publications, and wherein the information provided from these reviews is automatically systematized and statistically aggregated.

In the empirical communities (such as the scientific research and development community) it is common practice that community members will seek to reproduce only a portion of the experimental methodology of a published article (as opposed to the methodology in its entirety) as part of their own work, in order to build upon the results reported in the article. This implicitly tests the reproducibility of the published article (or some portion thereof). However, in prior systems this work is almost entirely unpublished, and generally not systematically discussed in public forum, and thus does not significantly contribute to the general state of technical understanding. This system captures this value by encouraging and providing a mechanism for the user base to publicly report and comment on these methodologies and findings.

As discussed above, the system and method of the invention herein incorporate at least two of the below elements in combination. This enables an improvement to the reliability of the empirical literature and offers a number of advantages over previous systems through the incorporation of four central, interconnected elements.

(1) User rating system for alignment of interests and incentivization of contribution (2) System and method for quantification for assignment of article rankings (3) Automated repository focused on experimental reliability (4) System and method for sub-article partitioning of reviews and content (1) User Rating System for Alignment of Interests & Incentivization of Contribution In more detail, element (1)—the user rating system creates alignment of interests and incentivization of community member contribution through creating and reporting one or more metrics which measure the contribution of an individual to the empirical community. Specifically, it is inherently in the interests of the scientific community overall, and for stakeholders in said community, for the published literature to be as reliable as possible. It is noteworthy that the utilization of these metrics can be of particular use for incentivization when utilized in a community formed from a professional endeavor (e.g. scientific research and development, medical research and practice, etc.), or from a social community (e.g. online hobbyist organizations), so that these metrics can have direct impact on a user's professional or social standing and opportunities.

As discussed above, prior methods relied upon either the personal initiative of researchers undertaking and publishing replication studies for which they receive disproportionately little return credit for their work input, or upon replication studies which are contracted for by the original researchers—a method which is professionally costly in both time and monetary terms. Therefore, while having the results of replication studies are strongly in the interests of the empirical community overall, the interests of individuals are often not sufficiently aligned to this end to carry out and report these studies in the literature at a desirable rate. Nonetheless, it is important to note that attempted replication of articles, in whole or in part, is a common practice in the general flow of the scientific efforts of individual labs in the course of their own research efforts. The results of these de facto replication studies, however, is seldom reported upon in a systematized public forum, due to various factors such as the associated difficulties of publishing in a traditional journal, and lack of credit for the replicated work.

In the invention herein, user-associated ranking metrics function to create an incentivization for community participants to report the results of such de facto replication studies, and to create an incentivization for authors to maximize the reproducibility articles which they have published. The utilization of a user rating system and method to reflect the contribution of a given user to the reliability of the published literature creates user incentives for contribution to the reliability of the literature and aligns the interests of both the individual, and of community interests of parties involved in the production and consumption of the empirical literature. This offers a number of advantages over previous methods in the art by more directly providing personal and near-term benefits for contribution. Specifically, a system and method of creating a system of rankings for individuals enables generation of statistically meaningful index metrics with professional, institutional and social relevance.

In a preferred embodiment of the current invention, this rating system will be comprised of more than one user rating index. In one embodiment, the invention may be embodied as two indices wherein one individual rating index for users/authors reflects the reviewed rating of published works by a particular author and the other index reflects contributions that users have made to the PPRIM repository outside of authoring these published works (e.g. in contributing replication reviews). Hereinafter, a user-rating index which reflects contributions that users have made to the PPRIM repository outside of authoring these published works will be referred to as the "C-Index." Hereinafter, an individual-rating index which reflects the overall rating of reviewed published works by a particular author will be referred to as the "R-Index."

Figure 3:
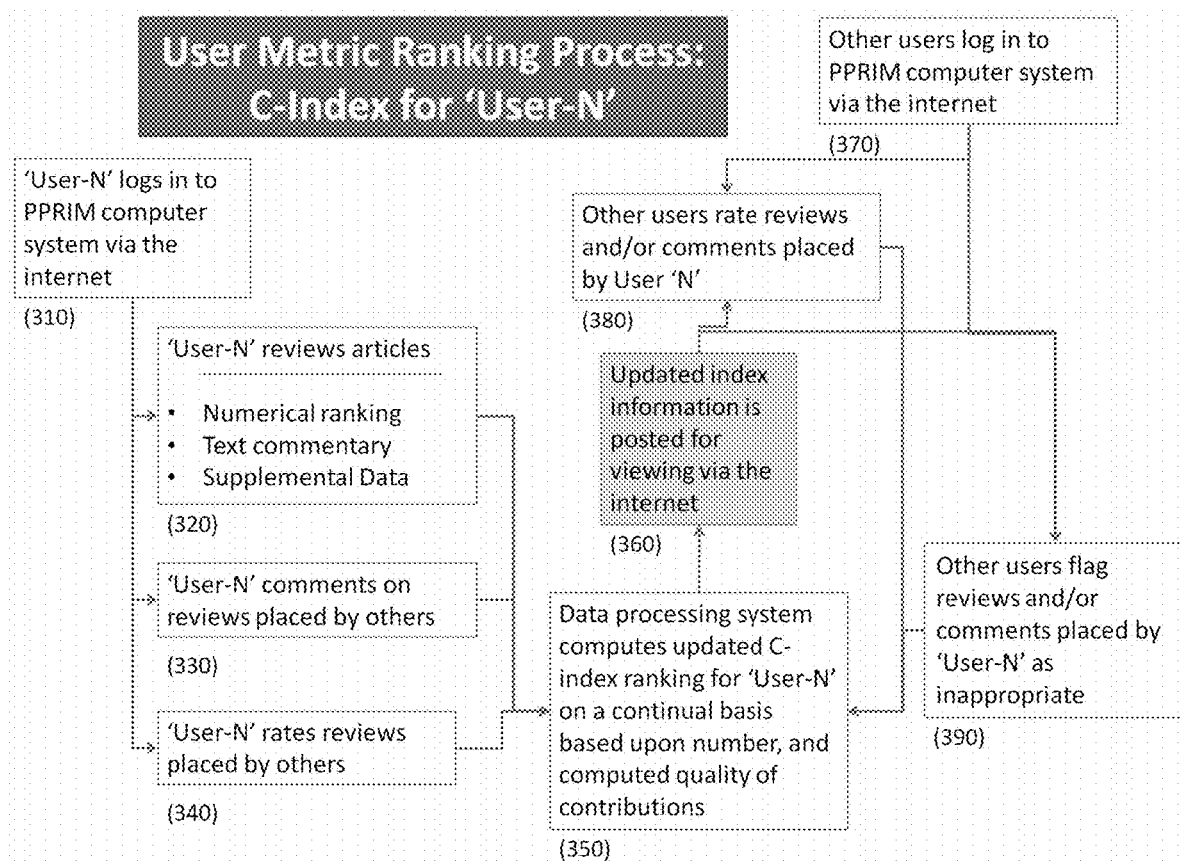
FIG. 3 is a flowchart illustrating a method of the present invention for calculating ranking information (the 'C-Index') for a user of the PPRIM system.
Figure 4:
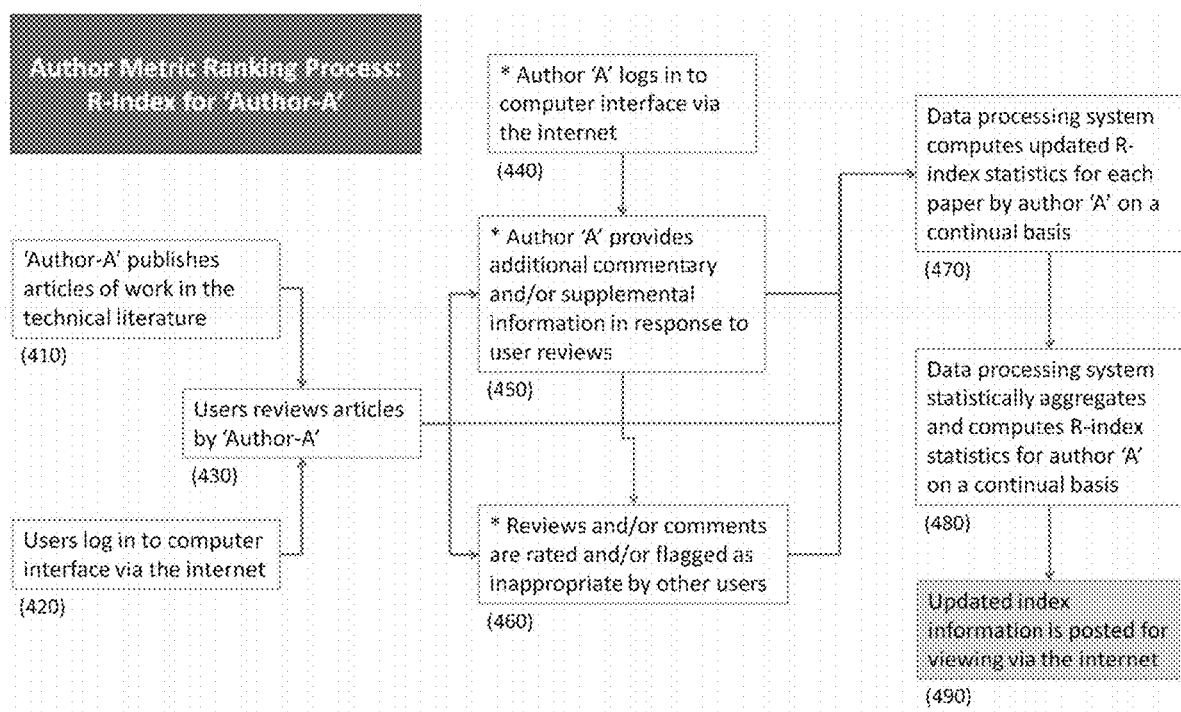
FIG. 4 is a flowchart illustrating a method of the present invention for calculating ranking information (the 'R-Index') for an author of the empirical literature.

In FIG. 3 (C-Index) and FIG. 4 (R-Index) there are shown exemplar embodiment methods for calculating two indices as an embodiment of the present invention. Specifically, in FIG. 3 there is shown a method for calculating an index which provides a metric for the contribution of any individual user to the reliability of the empirical literature through the PPRIM system. In FIG. 4 there is shown a method for calculating an index which provides a metric for the experimental and/or methodological reproducibility of work published by a given author.

In some embodiments the C-index will be calculated based upon factors such as number of reviews posted, helpfulness ratings of reviews posted, popularity of reviewed articles, etc.

Example formulas for calculation of C-Index and R-Index rankings are shown below:

C-Index Factor Statistical Aggregation Formula (Exemplar Embodiment)

$$C \propto w_\mathcal{R} \sum_\mathcal{R} h_\mathcal{R} a_\mathcal{R} + w_\mathcal{H} \sum_\mathcal{H} n_\mathcal{H} + w_\mathcal{A} \sum_\mathcal{A} h_\mathcal{A} a_\mathcal{A} + w_\mathcal{F} \sum_\mathcal{F} n_\mathcal{F}$$

- $R \sim$ reviews contributed by user 'N'
  - $w_R \sim$ weighting factor function for review contribution to C-index
  - $h_R \sim$ weighting factor function for other users helpfulness rating of review by user 'N'
  - $a_R \sim$ weighting factor function based on internal characteristics of the review (such as inclusion of text commentary and/or supplemental data in a given review)
- $H \sim$ helpfulness ratings contributed by user 'N'
  - $w_H \sim$ weighting factor function for helpfulness rating contribution to C-index
  - $n_H \sim$ weighting factor function for number 'helpfulness' ratings which user 'N' has provided regarding other user's contributions
- $A \sim$ author content contributed by user 'N'
  - $w_A \sim$ weighting factor function for author content contribution to C-index
  - $h_A \sim$ weighting factor function for other users helpfulness rating of content contributed by author
  - $a_A \sim$ weighting factor function based on inclusion of text commentary and/or supplemental data in a given review
- $F \sim$ flags against user 'N' contributed by other users and reviewed by moderators
  - $w_F \sim$ weighting factor function for flags contribution to C-index (typically negative)
  - $n_F \sim$ weighting factor function for number flags assessed by other users against user 'N' (after review of flag by moderator)

R-Index Factor Statistical Aggregation Formula
*(Exemplar Embodiment)*

$$R = \frac{\sum_{i=1}^{n} a_i c_i h_i r_i}{\sum_{i=1}^{n} a_i c_i h_i} \times 100$$

- $a_i$ = weighting factor function based on internal characteristics of the review (such as inclusion of text commentary and/or supplemental data in a given review)

- $c_i$ = weighting factor function based on user c-index

- $h_i$ = weighting factor function based on review helpfulness scores of review as assigned by other users

- $r_i$ = numerical review score assigned by user (scaled from 0 to 1)

It is noteworthy that while a user receives both altruistic and future personal benefit in the act of furthering their specific field of interest by increasing the average reliability of all current and future research based upon the reviewed work(s), the users more immediate interests can be aligned by incentivizing the user through index rankings to provide reviews which increase literature reliability.

For example, in an embodiment as shown above two ratings are used. One corresponds to an author rating index relating to the reproducibility ratings assigned to an author's published work through the PPRIM system, and in which the other rating index corresponds to a user rating index reflecting contributions made by a user to the reliability of the literature through the PPRIM system. This incentivizes community participants in three primary ways. First, it incentivizes authors to produce articles with increased reliability. Second, it incentivizes users of the PPRIM system to provide contributions which serve to increase the reliability of the literature corpus. Third, it incentivizes authors to participate in the PPRIM system as users (to maximize the R-index associated with their publication record). in which an author rating index derived from reproducibility ratings assigned to an author's published work—herein after referred to as the "R-Index"—for each particular author who has had one or more published works reviewed by other users on the PPRIM system (whereby authors with a high R-index have a high average reproducibility rating associated with articles that they have authored, and vice versa), this provides professional incentive to produce and publish high-quality, reproducible works. Furthermore, this R-index is inherently created and automatically generated by users contributing to the PPRIM database, for any author, whether or not said author participates in the PPRIM system. This provides an incentive for non-user authors to participate (and typically to become users). In particular, in a preferred embodiment authors may be able to comment on specific difficulties of reproducibility and/or methodology associated with their article and thus increase the effective reproducibility of said article and thereby increase the associated R-index which users will assign to their article. In this case users may optionally then revisit and change their rating associated with the article and future users will have the benefit of this additional information when attempting reproduction, and then rating said article so that author participation can be a mechanism whereby authors can improve the R-Index associated with their work.

In a preferred embodiment the C-Index provides a metric for the quantity, and the quality (as rated by other users) of a particular user's contributions, including article reviews and ancillary comments. This index provides a public platform to incentivize users to provide high-quality reviews and comments. In addition, the C-index creates a metric by which ratings which a user provides can be weighted when calculating aggregated article ranking scores to improve the statistical merit of both the review ranking and the corollary R-index derived therefrom (e.g. by giving greater weight to users with a high C-index when statistically aggregating the rating value calculated for a given article).

It is noteworthy that this dual and intercorrelated system of rating indices enables improvement versus various previous methods known in the art such as, such as the citation number, "H-Index", and "RG Score" in two key ways. Firstly, the use of a dual index creates particular incentivization for participation in the PPRIM system. Because the R-Index inherently exists for any author of a published article, as soon as an article that they have published is reviewed in the PPRIM system, regardless of if the author is a user or a non-user of the PPRIM system, and since the R-Index can act as a significant professional metric of the author's work, and since the R-Index of an author may be improved through participation in the PPRIM system by responding to reviews and providing guidance on how to best reproduce their work, this provides an incentive for the author to participate as a user of the PPRIM system. In addition, the C-Index exists only for registered users of the PPRIM system. This index provides a second metric related to the author's contribution to the empirical literature, which is not captured by other methods and thereby provides an additional, and unique, metric of professional and social significance. This method provides a mechanism which makes contribution to the reliability of the empirical literature in the immediate best of individual professionals in the field and thereby aligns the interests of these individuals to the interests of the overall community in terms of optimizing the reliability of the literature. Secondly, this system maximizes the impact of the PPRIM system on literature reliability by giving greater weight to reviews by users who are found to be most helpful in their contributions to the PPRIM system.

These indices may be displayed via a "Biographical Information" GUI for authors and/or users of the PPRIM system. An example embodiment of such a Biographical Information GUI is provided in FIG. 8

(2) System and Method for Quantification System for Assignment of Article Rankings As discussed above, prior methods in the art for improving the reliability of the empirical literature are largely non-systematic and qualitative. This increases the difficulty of accurate assessment of reliability of any particular article, or particular topic in the published work, and renders such assessments particularly susceptible to errors due to bias and variance.

Figure 6:
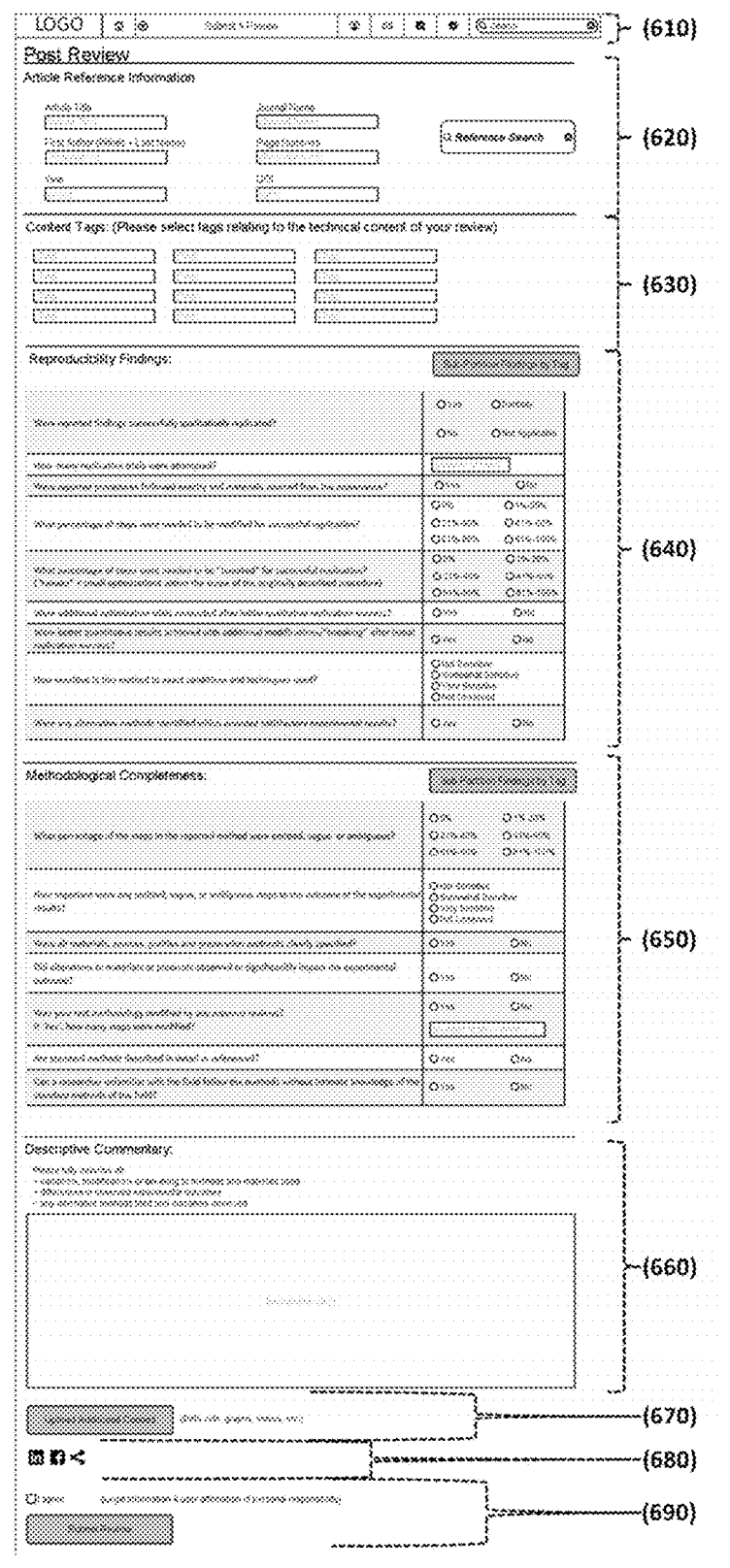
Figure 6:
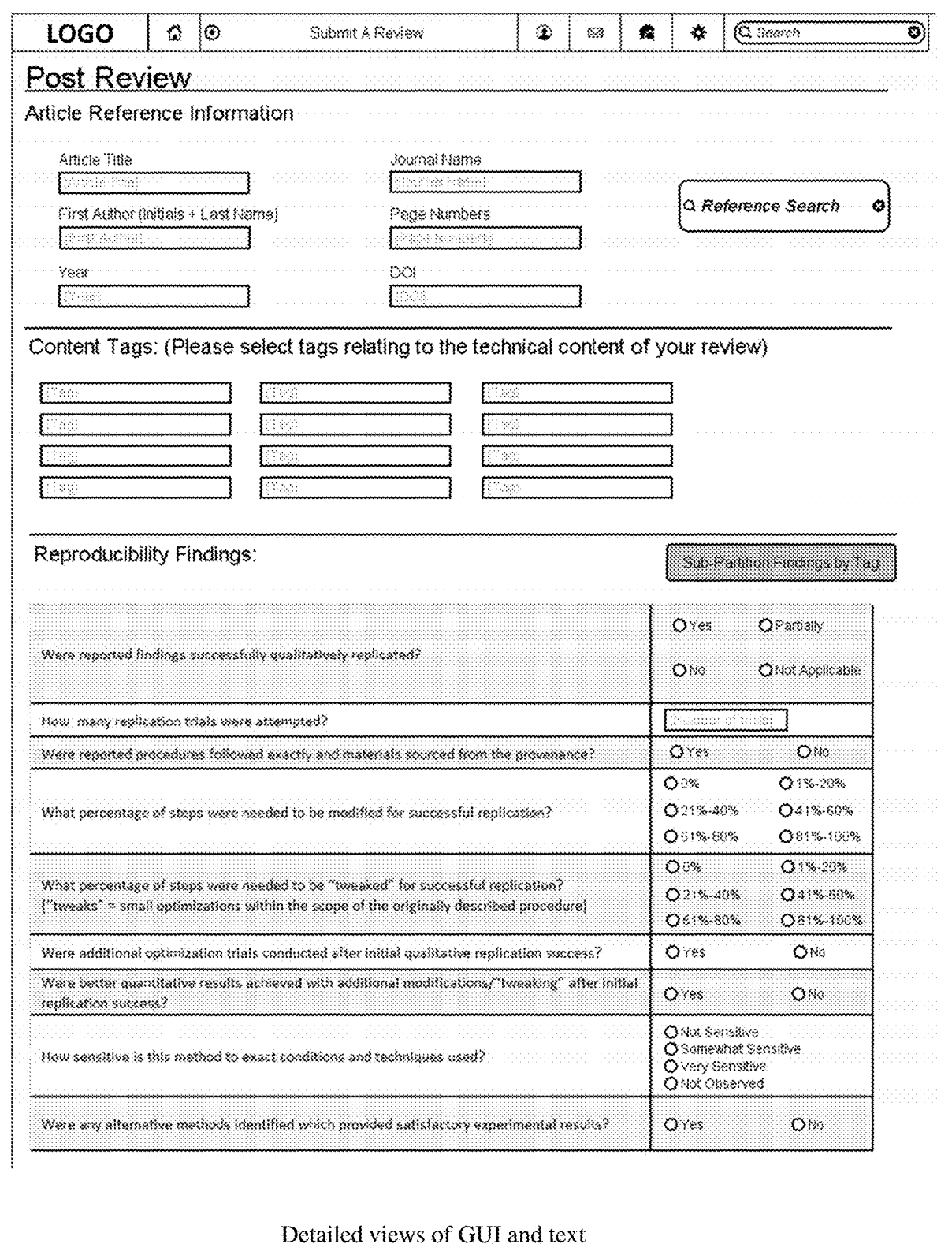
Figure 6:
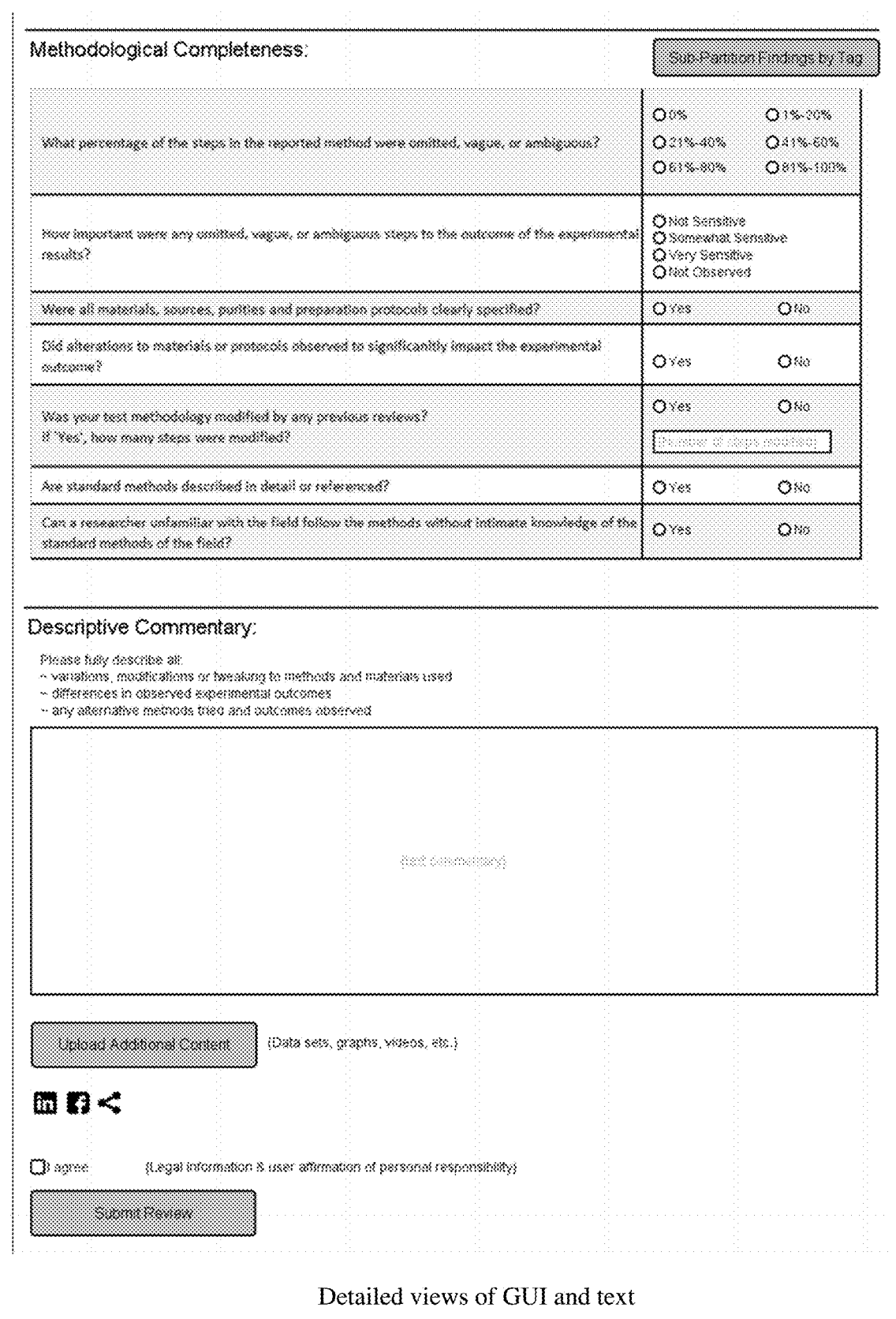

The method of this invention as described herein provides a means to quantify the quality of a published work, in regards to the experimental and/or methodological reproducibility of the article. In brief, this method comprises the utilization of a standardized set of substantially quantified questions and input fields regarding empirical observations pertaining to the reproducibility of a given article in the literature (either in total or some portion thereof). These questions are then to be answered by users who have directly conducted and observed the outcomes of experiments which pertain to these questions for a given article. In one embodiment, this method may be implemented as a set of standardized, substantially quantified questions which are answered by users, and evaluated according to a standardized, automated rubric to assign a score based upon the answers given. An example of an embodiment of the question set relating to experimental reproducibility and a GUI for implementing it is shown in FIG. 6. An example of an embodiment of the question set relating to methodological completeness and a GUI for implementing it is also shown in FIG. 6. In another embodiment, this method may be implemented as an input box wherein a user is instructed to assign a numerical ranking score and provided with a quantified numerical rubric for assigning this score based upon their relevant empirical experiences. In some embodiments, reviewing users may be required to agree to an affirmation statement that the replication work was performed by the reviewer personally. An example flowchart diagram illustrating an embodiment of the article review process according to this method is shown in FIG. 1. (As will be apparent to those skilled in the art, this rubric may be embodied utilizing a set of input fields regarding empirical reproducibility observations with suitable guidance to standardize the quantified outcome without casting them as a set of explicit questions.)

Each individual review is then statistically aggregated using a standardized formula. An example of such a formula is provided above as titled "R-Index Factor Statistical Aggregation Formula (Exemplar Embodiment)".

This method enables standardized quantification and meaningful statistical analysis. In the invention herein, objective guides are provided to the user in determining the numerical rankings given. Therein, this method transcends and offers significant advantages versus the typical methods practiced by other crowd-sourced review methodologies such as "Yelp" for businesses and "TripAdvisor" for travel, in that it enables quantified reviews based upon objective measures which are substantially homogenized across the user-base (and therefore statistically meaningful in aggregate), rather than reviews which are based upon subjective, non-standardized personal opinions and preferences.

In an example embodiment, a maximal rating score (e.g. 100) for experimental reproducibility might be given for a reported method that the reviewer successfully reproduced with substantially the same experimental results, on the first trial without needing subsequent trials, or methodological modifications versus the published methods. In contrast, a quantifiably reduced experimental score will be assigned according to the number of trials and/or methodological modifications required to obtain experimental results commensurate to those reported in the article (as well as for articles whose experimental results were never able to be reproduced by the reviewing user). Similarly, a maximal rating score for methodological completeness will be assigned for publications which enabled a reader to completely reproduce the publication's methodology without uncertainty or ambiguity. In contrast, a quantifiably reduced methodology score will be assigned according to the number and degree of guesses, and interpolations that a reader was required to implement to try to reproduce the methodology of a given publication. This enables reviews from a variety of individuals to be placed upon 'level footing' in assessing the reliability of the report, by guiding different reviewers to the same numerical rating rubric, and enables meaningful statistical analysis of the reviews provided by multiple independent users. The particular weighting for various aspects and questions utilized in this rubric may be different for different embodiments of this system to highlight metrics of greater or lesser importance to a particular application. For instance in scientific research and development users will typically conduct their empirical investigations differently than users engaged in reproducing "do-it-yourself" projects and different rubric score weightings may be most appropriate to accurately reflect suitable ranking scores.

Figure 7:
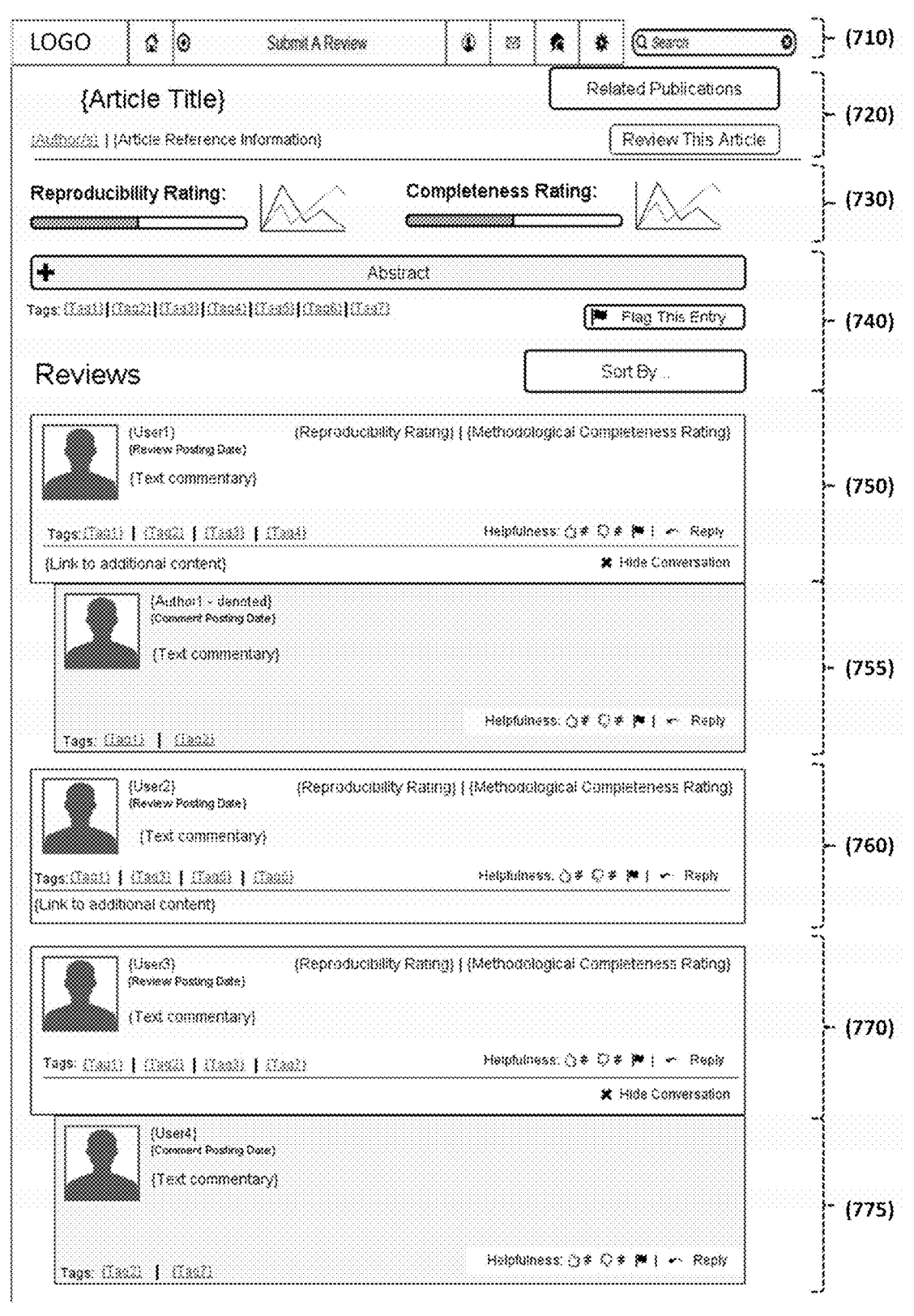

In some embodiments, these rankings and reviews will be displayed via a GUI as illustrated in FIG. 7.

In some embodiments this method will be utilized in conjunction with the collection of non-quantified data, such as the user's opinion as to how sensitive the method is to the exact conditions and techniques used, descriptive commentary of methodological modifications, etc.

In some embodiments, multiple different options may be accessible to the user for rating articles. For instance the level of detail in the rating question lists and rubrics may be varied for users to use to be able to provide more or less detailed methodology and experimental reproducibility information. In a preferred embodiment of this type, the plurality of rubrics utilized will be intercorellated in their outcome to substantially maintain statistical integrity of the resultant data.

(3) Automated Repository Focused on Experimental Reliability

As mentioned above, in prior methods, the mechanisms to improve reliability of the empirical literature are detrimentally impacted by factors including:
 a) the significant resource investment incurred by traditional replication studies and relatively low professional returns produced by publications of replication work in the modern research environment, and by the long timescale required to write and publish the findings of such a study.
 b) the lack of experimental verification as a part of the modern peer-review mechanism
 c) the additional cost and time associated with contract-based verification studies by independent laboratories
 d) the significant time lag between attempted replication of results, and the public publication of the replication trial by traditional means.

In the invention herein, these issues are significantly resolved and enable higher economic and labor efficiency by the use of an automated online repository focused on experimental replication.

Figure 5:
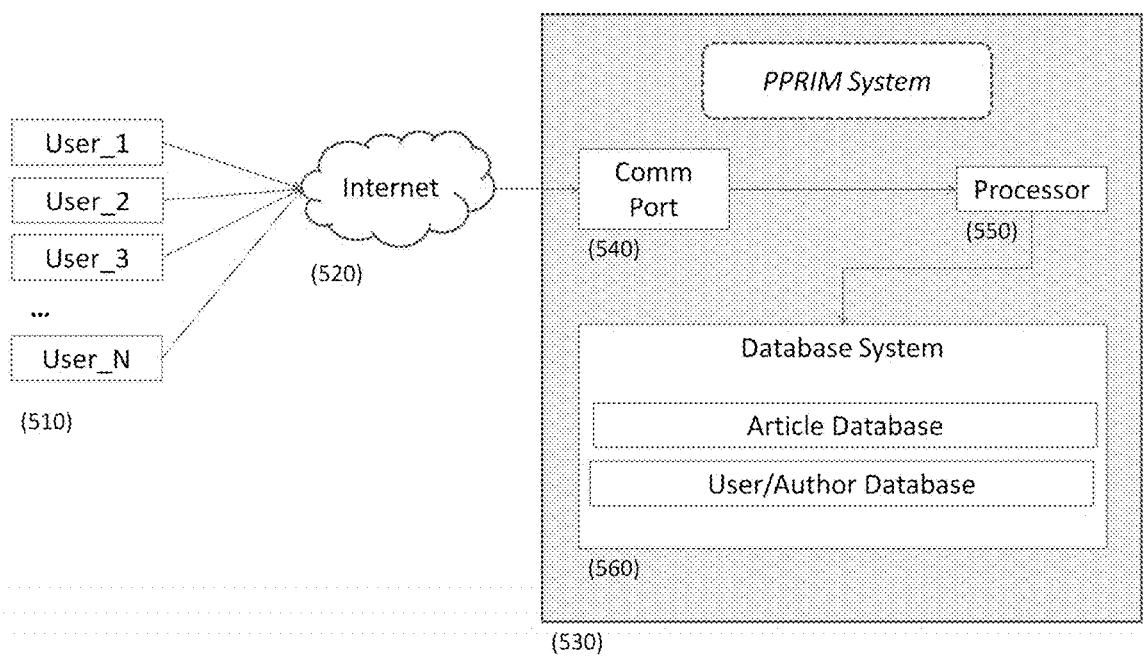
FIG. 5 is a diagram illustrating a computer system implementation of the present invention.

In a particular embodiment, this invention will be implemented on a computer system which is connected to a computer network which can be accessed by a plurality of users (e.g. the internet) wherein each of these users can access content for this system through a graphical user interface (a GUI) provided through the computer network (e.g. a website accessed by a browser and/or a standalone application which interfaces to the online system). A diagram of an example embodiment of this system architecture is provided below in FIG. 5.

This enables several advantages for the present invention including:
 a) the avoidance of delays and reduce the costs associated with traditional publication methods
 b) enablement of quantified focus on experimental replication and automatic and meaningful statistical processing and reporting/distribution of data derived therefrom
 c) enablement of meaningful, systematized, economically efficient publication of small pieces of experimentally useful information (smaller than the traditional 'minimum publishable unit'). In addition, the use of "micro-publishing" reproducibility findings provides a mechanism for users to receive due credit for their contributions, and provides further incentive for contributing, while streamlining the efficiency of contribution.
 d) enablement for the researcher to communicate their findings with a much smaller time and resource commitment by the researcher
 e) enablement and facilitation for posting of other inherently valuable information in addition to quantified numerical rankings such as commentary and discussions between users on a given article or sub-section of an article. E.g. this may enable users to post experiences on the bounds of a chemical method (where one chemical will work in a synthesis but a similar chemical will not), and/or may provide additional statistical rigor by increasing the size of a data set.
 f) in a preferred embodiment, this repository will be centralized to span the empirical literature which is being addressed, rather than e.g. only ranking articles associated with a particular publisher. This enables greater economic efficiency in time, and effort, both for posting, and searching for and assessing reviews of experimental practice in the published literature.

g) reduction of the time and effort required for the user to make a contribution (both by providing incentivization, and by lowering the barrier for contribution), as well as providing a public forum for discussion of the replicated works. This method improves the ratio of high-quality useful content contributed per user effort input, which enables higher quality and statistical reliability of ratings data.

h) enablement of efficient publication of information which can positively influence the effective accuracy of articles within the literature. Specifically, an article in combination with additional explanation through the PPRIM system can be more accurate than the article alone—e.g. by identifying ambiguous, potentially misleading or sensitive methodological details and clarifying them so that the resulting more complete method has improved accuracy versus the original article.

(4) System and Method for Sub-Article Partitioning of Reviews and Content

As discussed above, in common practice researchers will often seek to reproduce a portion of the experimental methodology of a published article to build upon the results reported in the article. Such work implicitly acts as a reproducibility study of said portion of the experimental findings of the original article. However, in prior systems, this work of de facto replication studies is largely unpublished, and only occasionally and unsystematically discussed in public forums, and thus does not, on average, significantly contribute to the general state of technical understanding. In the invention herein, a facile method is enabled for users to "micro-publish" these findings in a way that meaningfully contributes to the reliability of the scientific literature (particularly when combined with the other central elements, as described above) and systematize these micro-publications through the use of methods including searchable and indexed content provided via automated repository. (see element #3) This specifically enables community members to efficiently contribute to the reliability of the empirical literature based upon work that they performed incidentally without requiring further effort to perform a more complete or formal reproducibility study.

As will be clear to those skilled in the art, several methods may be utilized to embody the invention herein, with means for systematizing and sub-partitioning of reviews and content. In some embodiments of the invention herein, the assignment of 'tags' are used to identify specific content addressed by the review. These tags will be used to identify the various content topics pertaining to the technical field of the review. Examples of such content tags may include: "nanoparticle", "synthesis", "western blot", "plasmon", "titration", "cancer", "ceramic"; but will generally not include other subjective content, such as references to the quality of the article under review. (However, it is notable that other tags may also be used identify other aspects of the article, such as the sensitivity to changes in the methodology. In some embodiments, these may be automatically generated tag from review information.) In various embodiments these tags may be supplied by the user in the process of creating a review and/or selected by the user from suggestions automatically generated and supplied by the PPRIM system.

This method enables several significant advantages versus the prior art. These include:

a) enablement of meaningful & efficient review of sub-portions of a multi-part experimental methodology b) improved cataloging, indexing, and searching of content relating to methodology and experimental reproducibility information c) enablement of meaningful publication of small pieces of experimentally useful information (including pieces which are smaller than the traditional 'minimum publishable unit')

d) enablement of discussions on published methodologies—these discussions may be of either the totality or some sub-portion of a larger reported methodology In more detail, this invention may be embodied using an interface (such as a website, program, or stand alone application, or "app", among others), and an associated computer system, wherein the interface provides a user interface for users to interact with the PPRIM system. In some embodiments, this website will contain a plurality of page types which function as graphical user interfaces ("GUI"s) which enable users to perform actions and interact with data in the PPRIM system. In some embodiments these page types may include but are not limited to:

1. a page for a user to provide a review for a particular article
2. a page to display rating and review information for a particular article
3. a page to display biographical information for registered users and/or authors
4. a page for users to sign up as registered users
5. a page for users to search and/or browse for content
6. a page for users to save and view a particular set of articles or reviews for later viewing In the construction of these pages, techniques common in the art of website design may be utilized. In particular, design techniques and formats common to web-based information repositories such as "blogs" and forums are considered. Examples of pages for users to sign up as registered users and for users to input data for their biographical information pages, for users to search and/or browse for content, and for the saving and viewing of particular sets of articles are not given. These can be constructed without inventive steps utilizing techniques common in the art of website design.

Figure 2:
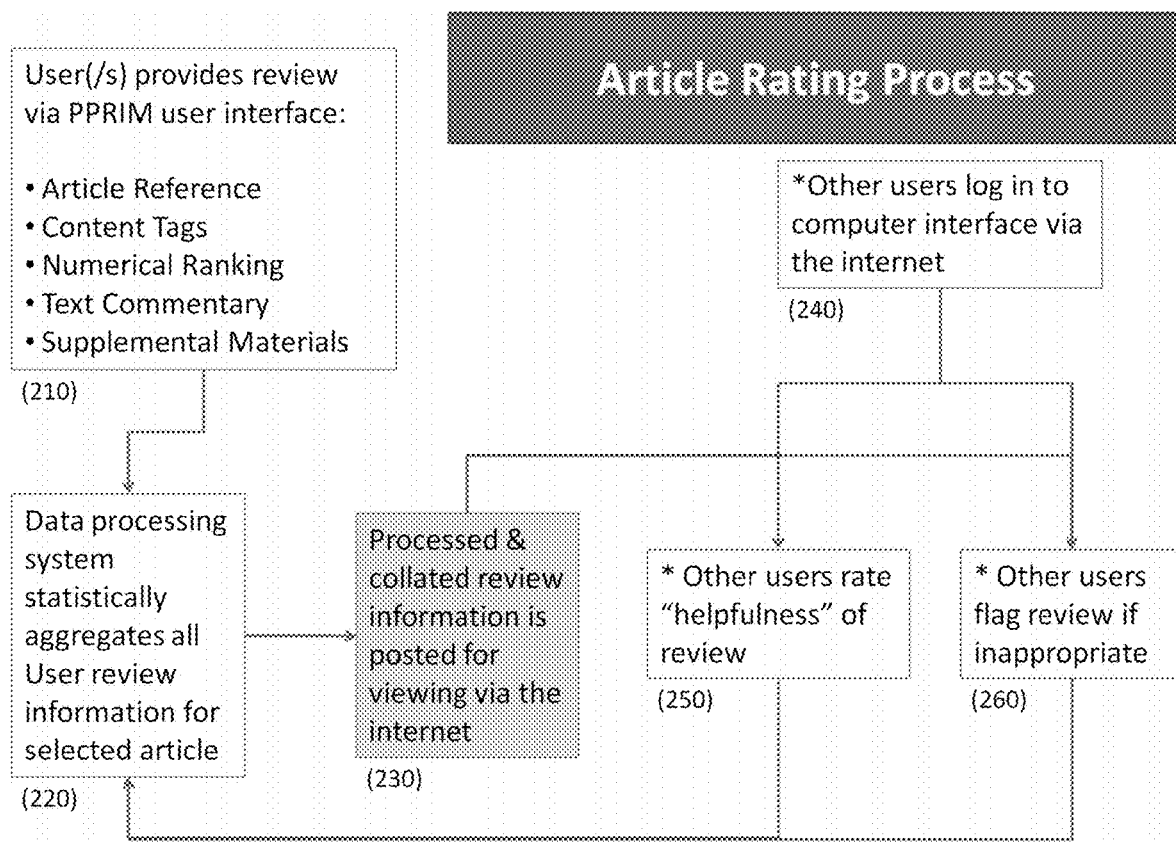
FIG. 2 is a flowchart illustrating a method of the present invention for calculating rating information for an article of the empirical literature.

An example embodiment of the GUI for a page for a user to provide a review for a particular article is shown in FIG. 6. This enables users to provide article reviews following the process for article review as shown in FIG. 1 and provides the input for the article rating process illustrated in FIG. 2 corresponding to step 210. In some embodiments a page for a user to provide a review for a particular article may include the following sections:

610: Header Bar

In the embodiment illustrated, the header bar contains a website logo, and key functions including a "home" button, a search function, a link to access user account information, and others.

620: Reference input section

In the embodiment illustrated, the reference input section contains a plurality of input fields for users to enter identifying reference information for the article which they will review.

In the embodiment illustrated, this section also contains a "Reference Search" function button through which users can search for, and then select the article which they will be reviewing and which function will automatically populate the reference fields.

In some embodiments this field could contain a GUI button for users to import citations from a user managed source (e.g. Mendeley, EndNote, Zotero, etc.)

In some embodiments the search function may be integrated with an external source or application such as Scifinder Scholar, Web of Knowledge, etc.

In some embodiments, this field could contain a GUI button which would enable the PPRIM system to automatically generate reference information from a document provided to the system by the user (e.g. a user uploaded pdf document of the article to be reviewed).

In the embodiment illustrated, this corresponds to step 120.

630: Content identification tags section

In the embodiment illustrated, the "Content Tags" section contains a plurality of input fields for users to enter text string "tags" which identify the technical field content of their review. For instance, suitable tags might be single or few word strings such as "optics", "nanoparticles", "transistor", "conjugation", "blot testing", "HPLC", "nano devices", etc.

In some embodiments PPRIM system may provide a list of suggested tags from which the user may select suitable tags. In some embodiments, such a list of suggested tags may be generated through the list of tags associated with the article in previous reviews. In some embodiments, an automatically generated set of tags may be scrubbed from uploaded documents, citation information, or other user input.

In the embodiment illustrated, this corresponds to step 130 of FIG. 1.

640: Quantified experimental reproducibility input section

In the embodiment illustrated, the experimental reproducibility quantified input section contains a standardized set of questions for the user to answer in making a review which enables a quantified, objective assessment according to a standardized rubric.

In the embodiment shown, these questions request information from the user regarding the user's empirical observations made in attempting to reproduce some portion of the article being reviewed. In the embodiment shown the substantial portion of these questions are (at least approximately) quantified. In the embodiment illustrated quantified inputs such as numerical input fields and radio buttons are utilized for user input.

In the embodiment shown, the field contains a button enabling the user to sub-partition their review according to one or more content tags. Thus by clicking this button the user is given the option to input empirical review information for multiple portions of the article partitioned according to content tag sets determined by the user. Once partitioned the user will typically then input quantified review information for each chosen set of tags independently. Thus for a multi-part experimental procedure reported in an article the user may use sub-partitioning to provide information which quantifiably indicates e.g. that one portion of the experimental procedure possesses 'good' reproducibility and another portion of the experimental procedure possesses 'poor' reproducibility.

In the embodiment shown, if the user answers the first question in 640 ("Were reported findings successfully qualitatively replicated?") with "Partially" this will offer the user the option to sub-partition findings by tag.

In some embodiments, reviews which are sub-partitioned by specific tags may be weighted more than reviews which are not.

In some embodiments, the user may be given the option to not answer some or all of the questions in this section. In such embodiments this will typically be taken into account in calculating the rank and weighting given to this review.

In some embodiments, the user may be given the option to answer a condensed question rubric, or a more complete question rubric. In a preferred embodiment of this type, the various rubrics utilized will be intercorrelated in their composition and scoring outcome to substantially maintain statistical integrity of the resultant data. In such embodiments, the type of rubric used will typically be taken into account in calculating the rank and weighting given to this review.

In the embodiment shown, the numerical ranking input section will include an option for the user to not rank the empirical reproducibility. In the embodiment shown, this may be accomplished by the user answering the first question ("Were reported findings successfully qualitatively replicated?") with "Not Applicable". This enables a user to provide contribution pertaining to the subject at hand without providing numerical ranking data. This is relevant to various circumstances such as where a user has tested some part of the experimental methodology, but not a portion which has direct implications for the overall reproducibility of the article per se.

As an example of such a situation, if an article used quantum dots from company "A" in a fluorescence biological tagging protocol. And a user sought to reproduce the method, but used quantum dots from company "B" and then found that these quantum dots are ineffective due to lack of biological fluorescence. In this case, such a finding can be considered not to have direct implications for the reproducibility reported in the original article, but is nonetheless pertinent information which contributes to the technical state of the art in the space surrounding said article. Thus, the user might opt to provide this informative commentary but not directly provide ranking information for the article.

In some embodiments, the composition of these input fields will be interactive according to the progression of user's answers to the questions. For instance, in FIG. 6, if the user were to answer "No" to question 1 ("Were you successfully able to qualitatively replicate the results?") then other questions such as question 4 ("How many steps needed modification for you to obtain successful replication?") would be greyed out and inaccessible to the user since any answer would make no sense and implicitly be in contradiction to their answer to question 1.

In the embodiment illustrated, this corresponds to part of step 140.

650: Quantified methodological completeness input section

In the embodiment illustrated, the methodological completeness section contains a standardized set of questions for the user to answer in making a review which enables a quantified, objective assessment according to a standardized rubric.

In the embodiment illustrated, the methodological completeness section contains a GUI button whereby the user can sub-partition the review according to content tags after the same general manner described above for 640.

In the embodiment shown, these questions request information from the user regarding the user's observations made regarding the methodological completeness of the article being reviewed. In the embodiment illustrated, the substantial portion of these questions are (at least approximately) quantified. In the embodiment illustrated, quantified inputs such as numerical input fields and radio buttons are utilized for user input.

In some embodiments, the user may be given the option to answer a condensed question rubric, or a more complete question rubric. In a preferred embodiment of this type, the various rubrics utilized will be intercorellated in their composition and scoring outcome to substantially maintain statistical integrity of the resultant data. In such embodiments, the type of rubric used will typically be taken into account in calculating the rank and weighting given to this review.

In the embodiment illustrated, this corresponds to part of step 140.

660: Text commentary input section

In the embodiment shown, the "Descriptive Commentary" section contains a text box for the user to input more detailed and/or qualitative information regarding their empirical observations in attempting to reproduce the article being reviewed. This text input field enables users to more fully describe pertinent observations by the user both qualitatively and quantitatively. This may include record of individual modifications made to experimental procedure and observed outcomes, experimental aspects which were particularly sensitive to technique or conditions used, etc. In the embodiment shown, this section contains a set of directives to the user as to what sort of information is being sought and appropriate in this section.

In the embodiment illustrated, this corresponds to step 150.

670: Supplementary data upload section

In the embodiment shown, the supplementary data upload section contains a GUI button for the user to upload additional content which is considered to be relevant to the review. Such content may comprise images, data tables, etc. In the embodiment shown, this section contains a set of directives to the user as to what sort of information is being sought here.

In the embodiment illustrated, this corresponds to step 160.

680: Social media section

In the embodiment shown, the social media section contains links whereby users can interface the posting of this review to a social media account or share it via e-mail.

690: Submission section

In the embodiment shown, the submission section contains a GUI button for users to submit this review to the PPRIM system for processing.

In the embodiment shown, this section will contain a text section informing and reminding users of associated legal information and user responsibilities. In the embodiment shown, this text section is associated with a checkbox for users to indicate that they have read and agree to the terms presented.

In some embodiments, clicking the GUI "Submit Review" button may trigger a protocol to check that all required fields have been entered and to notify the user of any deficiencies for them to correct before accepting the submission.

In some embodiments, this section may contain a GUI mechanism whereby the user submitting the review may opt to mask their identity in submitting a review for a certain amount of time (e.g. up to a year). This masking feature may be accomplished through a variety of methods as familiar to those in the art. For instance, the user identity of the reviewer will be stored by the PPRIM system but the "reviewed by" field on the display GUI will be publically listed as "anonymous until—and a date code". And after which date the PPRIM system will automatically convert this display to the reviewer user name on the article display GUI. This can be utilized to enable alignment of the interests of those submitting the review but who may have reason to wish to keep knowledge of their current work secret to the interests of the overall community in having the information provided in the review. For instance, in circumstances where an individual employed by a private company it is often the case that the company has a vested interest in not divulging what its employees are currently engaged in. Thus when an employee has attempted reproduction of an article in the course of their work, enabling the reviewer to hide their identity for a certain period of time can be utilized to post reviews without compromising the active interests of their employer.

In the embodiment illustrated, this corresponds to step 170.

An example embodiment of the GUI for a page to display rating and review information for a particular article is shown in FIG. 7. In some embodiments, the page to display rating and review information for a particular article may include the following sections:

710: Header Bar

In the embodiment illustrated, the header bar contains a website logo, and key functions including a "home" button, a search function, a link to access user account information and others.

720: Reference information section

In the embodiment illustrated, the reference information section contains identifying reference information for the particular article for which review information is being displayed. Such reference information may contain author names, article title, journal publication, and/or other citation information. In some embodiments various aspects of this information may be hyperlinked. For instance, the authors information may be hyperlinked to take one to the biographical information page of said author.

In the embodiment shown, this section may also contain a GUI button linking to related publications.

In the embodiment shown, this section may also contain a GUI button which the viewer can click to provide a review for the article.

In some embodiments this section may contain other functions and/or hyperlinks such as a "citation export" button, hyperlink to the article, hyperlink to the publisher's website, etc.

730: Rating Indices Section

In the embodiment shown, the rating indices section contains numerical and graphical representations of the rating index aggregate scores associated with the reviews for the article. For instance, the graphical representation could illustrate not only the average score but also the distribution of scores which the article has received.

In embodiment shown, the rating index display fields may be hyperlinked to enable users to "click-through" to access a more detailed breakdown of the statistical scores information for the article.

740: Identifying tags section

In the embodiment shown, the identifying tags section contains a list of content tags associated with the reviews for the given article.

In the embodiment shown, this section contains a GUI button enabling users to sort the displayed order of reviews according to various rules. Such rules may include review date, review experimental ("reproducibility") score, review methodological ("completeness") score, tags associated with the reviews, etc.

In the embodiment shown, this section contains a GUI button enabling the abstract for the article to be shown.

In the embodiment shown, this section contains a GUI button enabling a user to "flag" the article review page as having inappropriate content.

750-775: Individual review and review comments section/s

In the embodiment shown, the individual review and review comments section/s may contain one or more individual reviews and any commentaries associated to these reviews. In the example shown, this contains three reviews 750, 760, 770 and two commentaries 755 & 775 associated to reviews 750 & 770 respectively.

In the embodiment shown, each individual review contains:
- Identifying information of the posting user (including a hyperlinked user name and optionally an associated picture)
  - In some embodiments it may be possible for users to 'hide' their identity for a period of time as discussed above. In such cases the user identification field will reflect this accordingly.
- The posting date of the individual review
- Rating scores from the individual review (both R-Index and C-Index score as calculated from the individual review)
- Tags associated with the particular review
  - In the embodiment shown these tags will be clickable to display only reviews containing that tag.
- A section displaying the text commentary provided as part of the review
- A hyperlink to any additional content provided as part of the review
- A set of GUI buttons for actions which may be performed by a user reading the review including:
  - A "helpfulness rating" whereby users reading the review can rate it as helpful or not helpful. In some embodiments this information can be utilized to modify such things as the weighting of the particular review in its contribution to the statistical aggregate rating for the article, C-index rating for the user who provided the review, etc.
  - A "flag review" whereby users reading the review can flag the review as containing inappropriate content.
  - A "reply" whereby users reading the review can post a comment which will then be associated with the review.
- For reviews which have comments associated to them a GUI button appears which allows users to "hide" the conversation as is commonly used in the art of internet blogs and forums.

In the embodiment shown, each individual comment contains:
- Identifying information of the posting user (including a hyperlinked user name and optionally an associated picture)
  - In some embodiments, it may be possible for users to 'hide' their identity for a period of time as discussed above. In such cases the user identification field will reflect this accordingly.
  - In some embodiments, authors of the articles may post comments on reviews and in some embodiments this will be denoted in the user identification field for the comment.
- The posting date of the comment
- Tags associated with the particular comment. In some embodiments, these will be a sub-set of the tags associated with the review on which the comment is being made where the appropriate sub-set is selected by the user.
- A section displaying the text commentary provided as part of the comment
- A hyperlink to any additional content provided as part of the comment
- A set of GUI buttons for actions which may be performed by a user reading the comment including:
  - A "helpfulness rating" whereby users reading the review can rate it as helpful or not helpful. In some embodiments, this information can be utilized to modify such things as the weighting of the particular review in its contribution to the statistical aggregate rating for the article, C-index rating for the posting user, etc.
  - A "flag review" whereby users reading the review can flag the comment as containing inappropriate content.
  - A "reply" whereby users reading the review can post an comment which will then be associated with the review and comment thread.
- For comments which have further comments associated to them a GUI button appears which allows users to "hide" the conversation as is commonly used in the art of internet blogs and forums.

Figure 8:
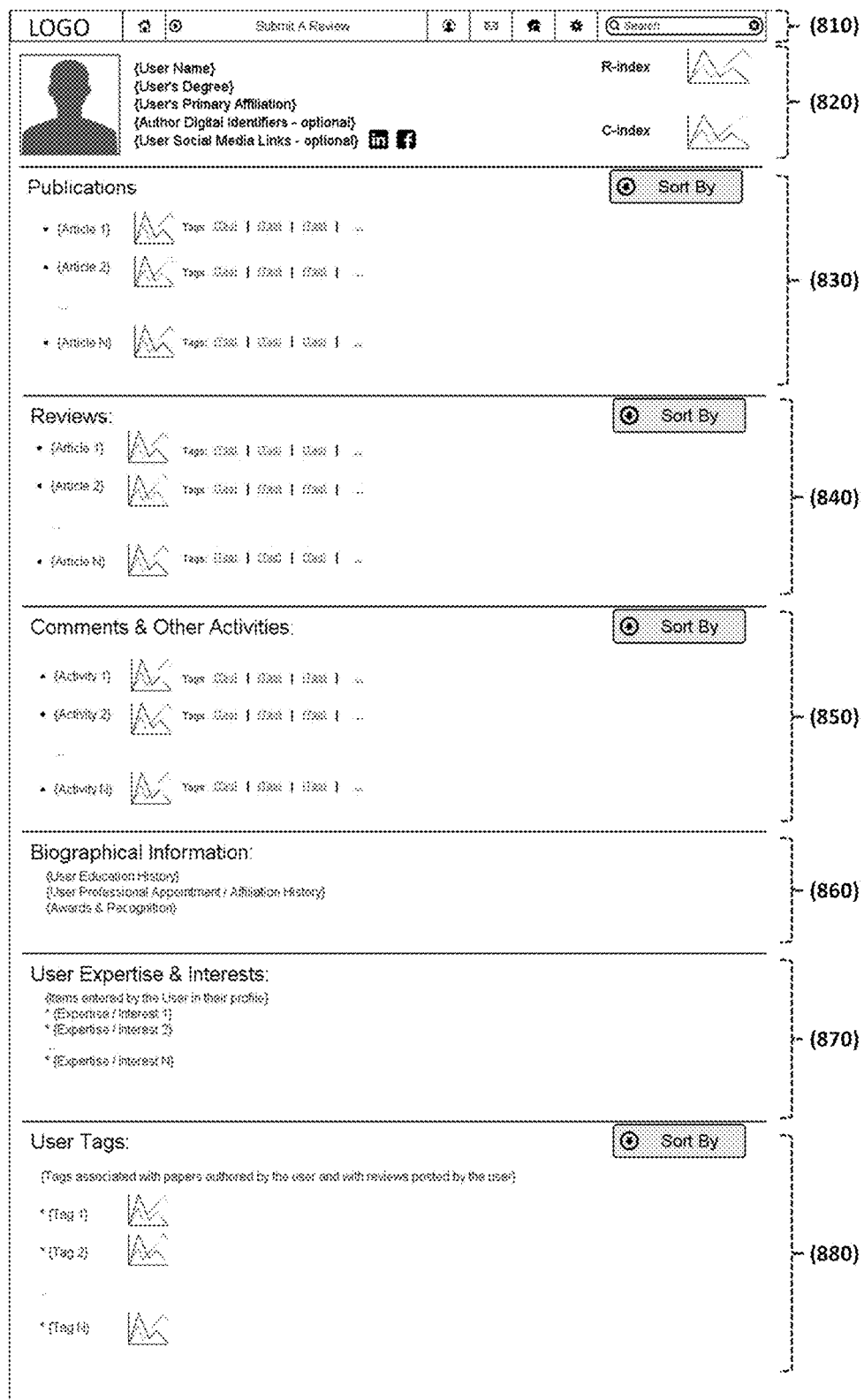
FIG. 8 is a GUI displaying an author/user profile according to an embodiment of the present invention.

An example embodiment of the GUI for a page to display biographical information for registered users and/or authors is shown in FIG. 8. In some embodiments, a portion of the biographical information will be supplied by the author/user while other portions (including C-Index & R-Index rankings, associated tags, etc.) will be automatically generated by the PPRIM system and may do so using methods standard in the art. In some embodiments, different portions of the biographical information may be inputted by the author/user OR automatically generated by the PPRIM system. In some embodiments, the page to display biographical information for registered users and/or authors may include the following sections:

810: Header Bar

In the embodiment illustrated, the header bar contains a website logo, and key functions including a "home" button, a search function, a link to access user account information, and others.

820: Personal Identifiers and Statistics

In the embodiment illustrated, the personal identifiers and statistics section contains standard personal and professional identifiers including:
- User Name
- User's Highest Educational Degree Held
- Users Primary Professional Affiliation Author Digital Identifiers
Links to Users Social Media Accounts and/or personal/professional websites
In some embodiments, this may include an action button enabling users to flag this as inappropriate (e.g. if the linked page does not belong to the author)
In the embodiment illustrated, this section contains user/author information for associated R-Index and C-Index rankings in both numerical value and graphical forms.
In some embodiments, these rankings may be clickable to display more detailed breakdown information of the statistical composition of these ratings.

830: Publications List

In the embodiment illustrated, the publications list section contains a list of publications by the user/author. In the embodiment illustrated, next to each article is provided information on the R-Index value for each publication and tags associated with the article.
This list may be populated automatically by the PPRIM system using extraction of publications lists from third party sources and/or by users of the PPRIM system who may input publication items into their biographical information and/or other common database methods known in the art.
In the embodiment illustrated, this section contains a GUI button which allows the users to sort articles according to a particular applied rule. Such rules may be in order of publication date, R-Index score, tags associated, etc.
In some embodiments this section will contain an action button to "flag" articles. This may be used e.g. for instances where listed articles are not accurate in being associated with this user as an author.

840: PPRIM Reviews

In the embodiment illustrated, the reviews list section contains a list of reviews posted to the PPRIM system by the user. In the embodiment illustrated, next to each review is provided information on the R-Index value for the user's review and tags associated with the review. In other embodiments this field may also include other information such as helpfulness ratings associated with tags associated with reviews and comments, etc.
In the embodiment illustrated, this section contains a GUI button which allows the users to sort reviews according to a particular applied rule. Such rules may include order of publication date, R-Index score, tags associated, helpfulness rating, etc.

850: PPRIM Comments

In the embodiment illustrated, the comments list section contains a list of comments posted to the PPRIM system by the user. In the embodiment illustrated, next to each comment is a list of tags associated with the comment.
In the embodiment illustrated, this section contains a GUI button which allows the users to sort comments according to a particular applied rule. Examples of such rules may be in order of publication date, R-Index score, tags associated, helpfulness rating, etc.

860: Biographical Information

In the embodiment illustrated, the biographical information section contains more detailed biographical information for the user including educational history, professional appointment/affiliation history, awards and recognition, etc. In some embodiments, these fields will be populated based upon inputs from the user.

870: Expertise & Interests

In the embodiment illustrated, the expertise and interests section contains a more detailed list of expertise and interests possessed by the user. In some embodiments, these fields will be populated based upon inputs from the user.

880: User Tags

In the embodiment illustrated, the user tags section contains a list of the tags which are associated with articles authored by the author/user and with reviews posted by the user. In the embodiment illustrated, R-Index score information for tags associated with articles by the author are provided along with said tags. In the embodiment illustrated, this section contains a GUI button enabling the user to sort the tag list. Examples of such rules may be in order by last usage date, R-Index score, relative frequency of usage, etc.

MODIFICATIONS

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. A method for grading and cataloging the repeatability of the results of a scientific experiment, the method comprising:

performing a first scientific experiment and storing data associated with the first scientific experiment in a database which is publicly available, wherein the data associated with the first scientific experiment comprises the parameters of the first scientific experiment and the results of the first scientific experiment, and further wherein the first scientific experiment is performed by a first party;

substantially repeating the first scientific experiment, wherein the repeated scientific experiment is performed by a second party, and storing data associated with the repeated scientific experiment in a database, wherein the data associated with the repeated scientific experiment is associated with the results of the repeated scientific experiment;

collecting data concerning the parameters of the repeated scientific experiment from the second party and storing the data concerning the parameters of the repeated scientific experiment in a database;

comparing the data of the repeated scientific experiment with the data of the first scientific experiment, and storing the comparison in a database;

using the data collected from the second party concerning the parameters of the repeated scientific experiment to derive a confidence factor;

transforming the comparison of the data from the repeated scientific experiment with the data from the first scientific experiment into a repeatability score relating to the probable repeatability of the first scientific experiment;

storing the repeatability score and the confidence factor in a database; and displaying the repeatability score to a user when the user accesses information about the first scientific experiment stored in a database.

2. A method according to claim 1 wherein the data collected from the second party is collected in a survey, and further wherein at least a portion of the survey is quantified according to at least one objective rubric.

3. A method according to claim 1 further comprising the steps of:
substantially repeating the repeated scientific experiment, and storing data associated with the second repeated scientific experiment in a database, wherein the data associated with the second repeated scientific experiment comprises the results of the second repeated scientific experiment;
collecting data concerning the parameters of the second repeated scientific experiment and storing the data concerning the parameters of the second repeated scientific experiment in a database;
comparing the data of the second repeated scientific experiment with the data of the first scientific experiment, and storing the comparison in a database;
using the data collected concerning the parameters of the second repeated scientific experiment to derive a second confidence factor;
transforming the comparison of the data from the second repeated scientific experiment with the data from the first scientific experiment into a second repeatability score relating to the probable repeatability of the first scientific experiment;
storing the second repeatability score and the second confidence factor in a database; and
displaying an aggregated repeatability score to the user, wherein the aggregated repeatability score is derived from an aggregation of the repeatability score and the second repeatability score, and further wherein the repeatability score is weighted using the confidence factor, and the second repeatability score is weighted using the second confidence factor.

4. A method according to claim 1 wherein additional rating data is collected from users who provide ratings related to the information provided by the second party, wherein the rating data is used as a contribution to calculate a ratings weighting function, wherein the ratings weighting function is applied to the confidence factor so as to derive a ratings weighted confidence factor, and further wherein the ratings weighted confidence factor reflects the quality of the evidence provided for replicability of the results of the scientific experiment as provided by the second party.

5. A method according to claim 1 wherein the data provided by the second party comprises at least one selected from the group consisting of:
the number of times that the repeated scientific experiment was performed by the second party,
the percentage of times which the repeated scientific experiment conducted by the second party successfully reproduced the outcomes reported by the first party in the first scientific experiment,
to what degree the outcomes of the repeated scientific experiment observed by the second party matched the outcomes of the first scientific experiment reported by the first party,
specific ways in which the outcomes of the repeated scientific experiment observed by the second party did not match the outcomes reported by the first party of the first scientific experiment,
additional optimization or modifications which were implemented by the second party in the repeated scientific experiment,
observations made by the second party concerning the effect of optimization or modifications of the parameters of the repeated scientific experiment on the results of the repeated scientific experiment,
the specific portions of the first scientific experiment that were repeated by the second party in the repeated scientific experiment,
a rating of the methodological completeness of the parameters of the first scientific experiment reported by the first party,
how sensitive the outcome of the repeated scientific experiment was to the exact conditions and techniques used, and
specific data obtained by the second party in the repeated scientific experiment, including descriptive commentary concerning the particular outcomes of the repeated scientific experiment observed by the second party.

6. A method according to claim 1 wherein at least some of the data collected from the second party associated with the second scientific experiment is categorized according to one or more electronically managed identifiers.

7. A method according to claim 1 wherein reputational data is collected about the second party and stored in a database, wherein the reputational data relates to the experience of the second party in the field of the scientific experiment, and further wherein the reputational data is transformed into a weighting function corresponding to a reputational confidence factor that relates to the probable reliability of the reported repeatability of the experiment, and further wherein the reputational confidence factor is used to adjust the assessment of probable replicability of the results of the scientific experiment.

8. A method according to claim 1 wherein the step of substantially repeating the first scientific experiment comprises modifying or refining at least one parameter of the first scientific experiment.

9. A computer system comprising memory, a central processing unit, and a display, the computer system being programmed to perform the following steps:
storing data associated with a first scientific experiment performed by a first party in a database stored in memory, wherein the data associated with the first scientific experiment comprises the parameters of the first scientific experiment and the results of the first scientific experiment;
storing the data associated with the parameters and the results of a second scientific experiment performed by a second party in the database, wherein the second scientific experiment is substantially the same scientific experiment as the first scientific experiment;
using the central processing unit to compare the data of the second scientific experiment with the data of the first scientific experiment, and storing the comparison in the database;
using central processing unit to derive a confidence factor, wherein the confidence factor reflects the data collected from the second party concerning the parameters of the repeated scientific experiment;
transforming the comparison of the data from the repeated scientific experiment with the data from the first scientific experiment into a repeatability score relating to the probable repeatability of the first scientific experiment;

storing the confidence factor and the repeatability score in the database; and displaying the repeatability score to a user on the display when the user accesses information about the first scientific experiment stored in the database.

10. A method for grading and cataloging the repeatability of the results of a scientific experiment, the method comprising:

performing a first scientific experiment comprising a plurality of portions, and storing data associated with the plurality of portions of the first scientific experiment in a database which is publicly available, wherein the data associated with the plurality of portions of the first scientific experiment comprises the parameters of the first scientific experiment and the results of the first scientific experiment, and further wherein the first scientific experiment is performed by a first party;

substantially repeating one or more portions of the plurality of portions of the first scientific experiment, wherein the repeated one or more portions of the scientific experiment are performed by a second party, and storing data associated with the repeated one or more portions of the scientific experiment in a database, wherein the data associated with the repeated one or more portions of the scientific experiment comprises the results of the repeated one or more portions of the scientific experiment;

comparing the data of the repeated one or more portions of the scientific experiment with the data associated with the one or more portions of the first scientific experiment, and storing the comparison in a database;

transforming the comparison of the data from the one or more portions of the repeated scientific experiment with the data from the one or more portions of the first scientific experiment into a plurality of repeatability scores, wherein each of the plurality of repeatability scores corresponds to the probable repeatability of that portion of the first scientific experiment;

storing the plurality of repeatability scores in a database; and displaying the plurality of repeatability scores to a user when the user accesses information about the first scientific experiment stored in a database.

11. A method according to claim 10 further comprising the steps of:

substantially repeating the one or more portions of the plurality of portions of the first scientific experiment, and storing data associated with the second repeated one or more portions of the plurality of portions of the first scientific experiment in a database, wherein the second repeated one or more portions of the plurality of portions of the first scientific experiment is performed by a third party, wherein the data associated with the second repeated one or more portions of the plurality of portions of the first scientific experiment comprises the results of the second repeated one or more portions of the plurality of portions of the first scientific experiment;

collecting data concerning the parameters of the second repeated one or more portions of the plurality of portions of the first scientific experiment from the third party and storing the data concerning the parameters of the second repeated one or more portions of the plurality of portions of the first scientific experiment in a database;

comparing the data of the second repeated one or more portions of the plurality of portions of the first scientific experiment, and storing the comparison in a database;

using the data collected concerning the parameters of the second repeated one or more portions of the plurality of portions of the first scientific experiment to derive a second confidence factor;

transforming the comparison of the data from the second repeated one or more portions of the plurality of portions of the first scientific experiment with the data from the first scientific experiment into a second repeatability score relating to the probable repeatability of the first scientific experiment;

storing the second repeatability score and the second confidence factor in a database; and displaying an aggregated repeatability score to the user, wherein the aggregated repeatability score is derived through the use of a weighting function which combines the repeatability score, the second repeatability score, the confidence factor and the second confidence factor.

12. A method according to claim 11 wherein the aggregated repeatability score is displayed to the user in a plurality of forms including one or more representations of the statistical distributions of the reproducibility scores and associated confidence factors.

13. A method according to claim 10 wherein the data collected from the second party associated with the repeated one or more portions of the scientific experiment is collected in a survey.

14. A method according to claim 10 wherein the data collected from the second party associated with the repeated one or more portions of the scientific experiment is collected in a form, and further wherein at least a portion of the form is quantified according to objective rubrics.

15. A method according to claim 10 wherein at least some of the data collected from the second party associated with the repeated one or more portions of the scientific experiment is categorized according to one or more electronically managed identifiers.

16. A method according to claim 10 wherein reputational data is collected about the second party and stored in a database, wherein the reputational data relates to the experience of the second party in the field of the scientific experiment, and further wherein the reputational data is transformed into a weighting function corresponding to a reputational confidence factor that relates to the probable reliability of the reported repeatability of the experiment, and further wherein the reputational confidence factor is used to adjust the assessment of probable replicability of the results of the scientific experiment.

17. A method according to claim 16 wherein the reputational data comprises at least one characteristic of the second party selected from the group consisting of: the second party's contribution to their field, the second party's credibility in their field, the second party's history in their field, the second party's experience in their field, the second party's education, the second party's commentary in their field, and the second party's timeliness in their field.

18. A method according to claim 16 wherein the reputational data comprises at least one selected from the group consisting of: the number of reviews by the second party stored in the database, the helpfulness ratings of the reviews by the second party stored in the database, and the popularity of reviews by the second party stored in the database.

19. A method according to claim 10 wherein additional data is collected from users who provide ratings related to the data provided by the second party, and wherein the additional data is used as a factor to calculate a weighting function relating to a replicability confidence factor, wherein the replicability confidence factor reflects the quality of the evidence provided for replicability of the results of the scientific experiment as provided by the second party.

20. A method according to claim 10 wherein the data provided by the second party comprises at least one selected from the group consisting of:

- the number of times that the repeated scientific experiment was performed by the second party,
- the percentage of times which the repeated scientific experiment conducted by the second party successfully reproduced the outcomes reported by the first party in the first scientific experiment,
- to what degree the outcomes of the repeated scientific experiment observed by the second party matched the outcomes of the first scientific experiment reported by the first party,
- specific ways in which the outcomes of the repeated scientific experiment observed by the second party did not match the outcomes reported by the first party of the first scientific experiment,
- additional optimization or modifications which were implemented by the second party in the repeated scientific experiment,
- observations made by the second party concerning the effect of optimization or modifications of the parameters of the repeated scientific experiment on the results of the repeated scientific experiment,
- the specific portions of the first scientific experiment that were repeated by the second party in the repeated scientific experiment,
- a rating of the methodological completeness of the parameters of the first scientific experiment reported by the first party,
- how sensitive the outcome of the repeated scientific experiment was to the exact conditions and techniques used, and
- specific data obtained by the second party in the repeated scientific experiment, including descriptive commentary concerning the particular outcomes of the repeated scientific experiment observed by the second party.

21. A method according to claim 10 wherein the step of substantially repeating one or more portions of the plurality of portions of the first scientific experiment comprises modifying or refining at least one parameter of the first scientific experiment.

\* \* \* \* \*